May 21, 1968  J. E. F. VANHENTENRIJK ET AL  3,384,250
TRANSFER MECHANISM
Filed Jan. 25, 1965  9 Sheets-Sheet 1
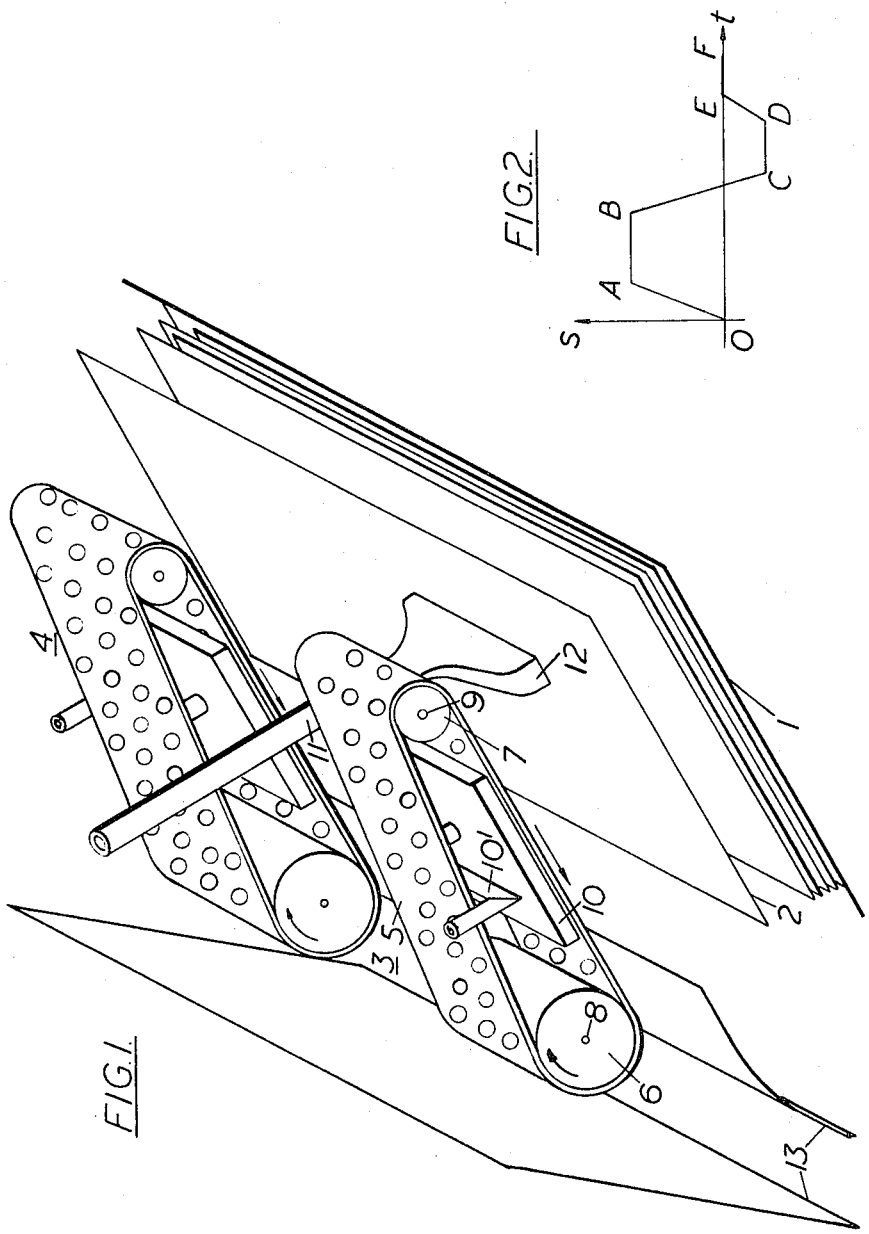
Inventors
JOSEPHUS E. F. VANHENTENRIJK
ERIC H. E. DILLOW
FRANCOIS LENSSEN
By
Attorney

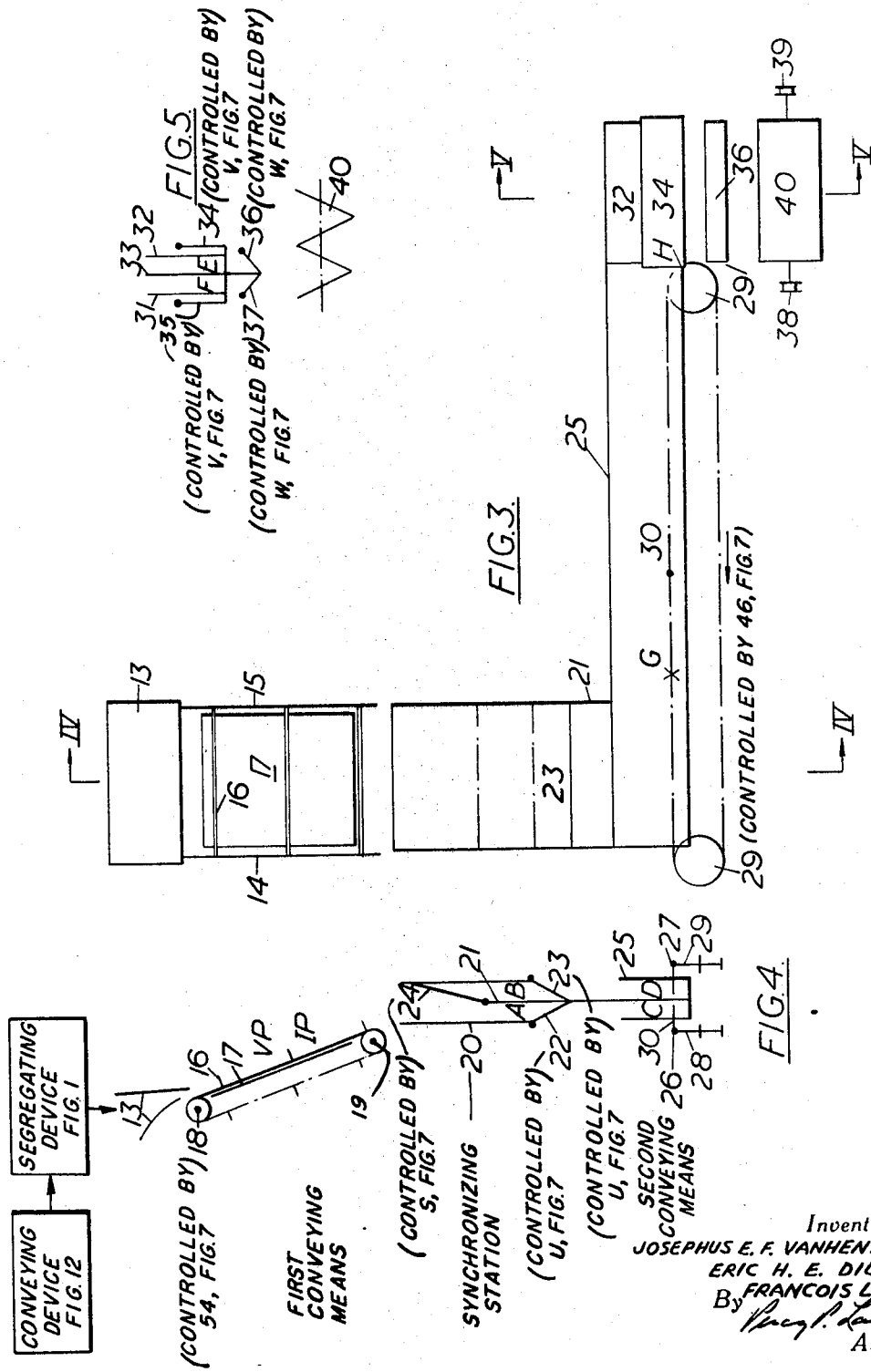

May 21, 1968    J. E. F. VANHENTENRIJK ET AL    3,384,250

TRANSFER MECHANISM

Filed Jan. 25, 1965            9 Sheets-Sheet 4

Inventors
JOSEPHUS E. F. VANHENTENRIJK
ERIC H. E. DILLOW
FRANCOIS LENSSEN
By
Attorney

3,384,250
TRANSFER MECHANISM

Josephus Evaristus Firminus Vanhentenrijk, Mortsel, Eric Henry Edward Dillow, Deurne, and François Lenssen, Wilrijk, Belgium, assignors to International Standard Electric Corporation, New York, N.Y., a corporation of Delaware Filed Jan. 25, 1965, Ser. No. 427,748
Claims priority, application Netherlands, Jan. 24, 1964, 64—535

16 Claims. (Cl. 214—11)

The present invention relates to a transfer mechanism for transferring letters or similar flat objects from a first conveying means onto a second conveying means via a displaceable diverting means, displaceable from a first position towards a second position, and a synchronizing station with a first and a second synchronizing position in which a first and second transfer means is mounted respectively, first control means being provided for positioning said displaceable diverting means to divert a letter to said first or second synchronizing position and second control means being provided for operating said first and second transfer means in timed relationship with said second conveying means to transfer a letter from said first or second synchronizing position to said second conveying means.

Such a transfer mechanism is already known from the U.S. Patent 3,018,009. In this known transfer mechanism said first and second synchronizing positions are constituted by the compartments of a two-compartment chute and in order to be able to divert a letter to one of these compartments said displaceable diverting means are relatively complicated and constituted by a displaceable frame carrying a belt, rollers and also driving means for this belt, the letter to be diverted being seized between the belt and the rollers. Such a positive transfer of the letters is especially required when it is desired not to have compartments with a large width.

Another drawback of this known transfer mechanism is that the outer walls of said chute are each constituted by a conveyor and driving means therefor.

It is therefore an object of the present invention to provide a transfer mechanism of the above type wherein said displaceable diverting means and said chute are of a very simple structure.

The present transfer mechanism is characterized in that said second control means operate said first and second transfer means in an alternative and periodic manner and that said first control means control said displaceable diverting means so as to divert a letter, which has to be passed to said second conveying means, to a synchronizing position wherein the transfer means are not operated.

Another characteristic of the present transfer mechanism is that said displaceable diverting means are constituted by a movable two-position deflector plate which when in its first position permits and prevents the access to said first and second synchronizing positions respectively and which when in its second position permits and prevents the access to said second and first synchronizing positions respectively.

Still another characteristic of the present transfer mechanism is that said first conveying means are mounted in an inclined position and that said movable deflector plate is mounted below the lower end of said first conveying means.

Yet another characteristic of the present transfer mechanism is that said first and second synchronizing positions are constituted by the first and second juxtaposed compartments of a two-compartment chute respectively, and that said first and second transfer means are constituted by the first and second movable bottom flaps of said first and second compartments respectively, said compartments being closed and open when the associated bottom flap is in its first and second positions respectively.

Another drawback of the transfer mechanism disclosed in the above U.S. Patent No. 3,018,009 is that between said first conveying means and said displaceable diverting means two further devices are mounted.

The present transfer mechanism, however, is further characterized in that said first conveying means is constituted by a single inclined conveyor which is arranged between a segregating device for segregating letters from a stack of such letters and said movable deflector plate.

The present transfer mechanism further relates to a coupling mechanism between a driving shaft and a driven shaft in which the torque may be transmitted by means of a first coupling member mounted on one of said shafts and able to be operatively coupled to the other of said shafts under the control of a first spring, characterized in that said first coupling member is mounted on said driving shaft, together with a second coupling member which is able to be operatively coupled to said driven shaft under the control of a second spring the tension of which is so chosen that said second coupling member is by itself uncapable of realizing the coupling of said driving and driven shafts.

The present transfer mechanism also relates to a segregating device for individually removing a flat article from a stack of such articles and for transferring it afterwards to a conveyor by means of an arm provided with at least one suction nozzle, characterized in that it includes displacement means for displacing said arm in such a manner that when it has sucked off one or more articles from said stack it is displaced towards said conveyor in such a manner that all the sucked articles which are not in contact with said suction nozzle are able to drop back on said stack under influence of their own weight.

The present transfer mechanism finally also concerns a conveying device, characterized in that it includes a a conveyor parallel to which is mounted at least one rod along which a support is able to slide and about which said support is able to pivot.

The above mentioned and other objects and features of the invention will become more apparent and the invention itself will be best understood by referring to the following description of embodiments taken in conjunction with the accompanying drawings in which:

FIG. 1 is a perspective view of a segregating device forming part of a transfer mechanism according to the invention;

FIG. 2 is a displacement-versus-time diagram of the suction head forming part of this segregating device;

FIG. 3 represents a front view of the present transfer mechanism, the devices of FIG. 1 and FIG. 12 excepted;

FIGS. 4 and 5 show cross-sections across the lines IV—IV and V—V of FIG. 3 respectively;

Figure 12:
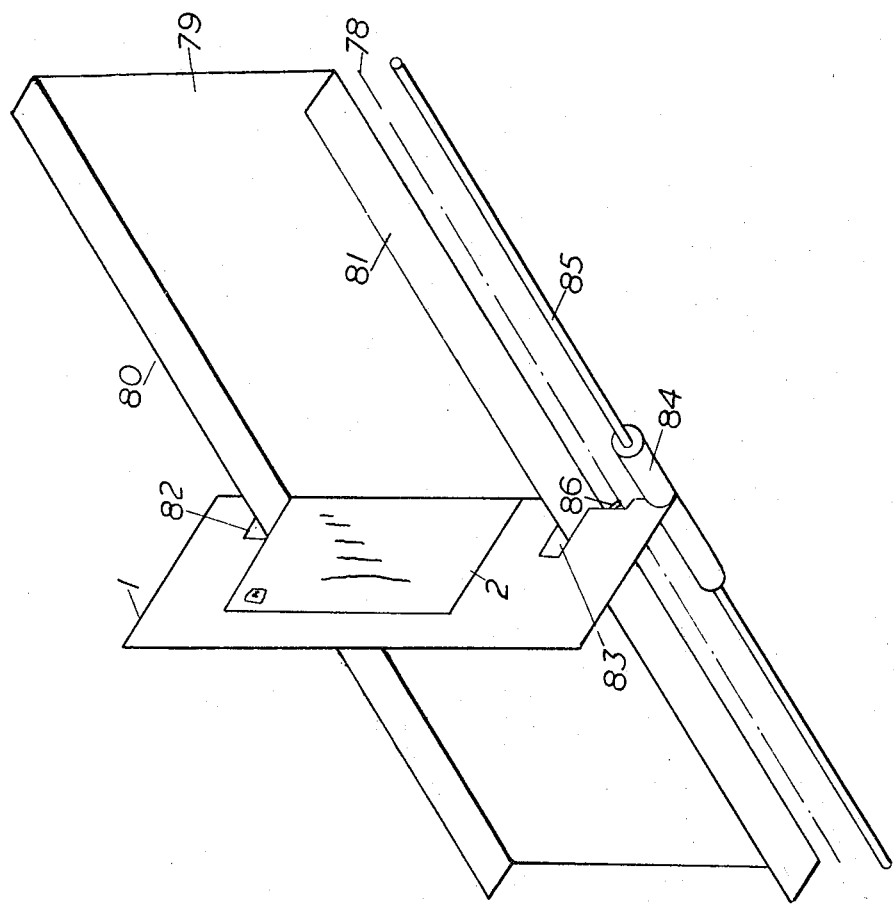
FIG. 12 is a perspective view of letter conveying device.

Principally referring to FIG. 12, the conveying device includes an inclined conveyor constituted by two parallel conveyor chains, of which only conveyor chain 78 is shown. These conveyor chains are mounted at both sides of the upstanding laterial edges 80, 81 of the U-shaped channel 79. Parallel to each of the conveyor chains, such as 78, is mounted a rod 85 along which and about which a hollow cylinder 84, integral with a support 1, is able to slide and pivot respectively. This support has two parallel apertures 82, 83 and a protruding pin 86 and it supports a stack of letters such as 2.

In order that the support 1 should convey upwardly the stack of letters 2 in the channel 79, it is sufficient to displace the conveyor chains 78 and to bring the support 1 in the position shown, wherein the upstanding lateral edges 80, 81 extend in the aperture 82, 83 and wherein the pin 86 is inserted in an opening of a link of the associated chain 78. When the support 1 has reached its uppermost position it may easily be brought back into its lowermost position by disengaging the pin 86 out of the opening of the link wherein it is engaged and by pivoting the support about the rod 85 and sliding it downwardly along this rod. In this manner, when there are two supports each carrying a stack of letters, the relative position of these supports with respect to the direcion of displacement of the conveyor may easily be modified at will.

Principally refering to FIG. 1, the displacement of the conveyor chains 78 is controlled in an obvious way by a photocell (not shown) stopping the movement of these chains each time the uppermost letter of the stack of letters 2 supported by the support 1 is located at a predetermined distance from two substantially identical conveying means 3 and 4 which are mounted above the top end of the chains 78 and which form part of a segregating device for individually removing a letter from the above stack of letters. Since these conveying means 3 and 4 are substantially identical only one of them is described in detail. The conveying means 3 are constituted by an endless perforated conveying belt 5 which is carried by the rollers 6 and 7, the driving roller 6 having a shaft 8 and the roller 7 being freely rotatable about the axle 9. The conveying level of the belt 5, i.e. the portion thereof which is directed towards the support 1, is parallel to this support and is located in front of a suction chamber 10 the front part of which is perforated and the rear part of which communicates with a vacuum pump (not shown) via the conduct 10'. The only difference between the conveying means 3 and 4 is that the conveying belt of the conveying means 4 is larger than the conveying belt of the conveying means 3 in order that letters of any length should be able to be conveyed by these conveying belts, the one edges of these letters being normally situated along the lateral edge of the U-shaped channel 79 (FIG. 12). Between the conveying devices 3 and 4 and perpendicular to the support 1 is mounted a suction arm 11 provided with a suction head 12 and forming part of the above segregating device also comprising a cam T (FIG. 7) controlling the movement of the suction arm 11 in an obvious but not shown manner. When rotated the cam T replaces the suction head 12 in such a way that the suction head 12 remains substantially perpendicular to the support 1 and is moved in one direction from its rest or first position, wherein its front part is situated in a plane located between the uppermost letter of the sack of letters carried by the support 1 and the conveying level of the belts such as 5, towards a second position wherein this front part is situated beyond this conveying level, further in the opposite direction towards a third position wherein the front part of the suction head 12 makes contact with the front letter of the stack, this letter being thus sucked up, and finally back towards the above first position.

Principally referring to FIG. 2 the displacement(s) of the suction head 12 from its first position towards its second position, further towards its third position and finally back towards its first position are represented with respect to time (t), by the line segments OA, BC and DE respectively. Hereby it is to be noted that the suction head 12 remains in its first position during a time interval equal to EF, in its second position during a time interval represented by AB and in its third position during a time period represented by CD. After a letter has been sucked up and brought in its first position, the suction head 12 is displaced from this first position towards its second position and during this movement the letter is brought into contact with the conveying level of the perforated conveying belts, such as 5, by means of which it is conveyed into the channel 13 mounted below and in the prolongation of these belts. The suction head 12 remains a sufficiently long time interval, represented by the segment AB in FIG. 2, in its second position in order to permit the letter to be entered into the channel 13 by the conveying belts 5. The suction head 12 remains a sufficiently long time period, represented by the segment CD in FIG. 2, in its third position in order to permit a letter to be sucked up in that position. When it happens that two letters instead of one are erroneously sucked up in this third position, the letters which are not in contact with the suction head 12, have a sufficiently long time to drop back on the support 1 due to the fact that the time of displacement of the suction head 12 from the third position towards the first position, the time interval during which it remains in this first positon and further the time of displacement towards the above conveyng level are relatively long.

Principally referring to the FIGURES 3 to 8, the above channel 13 terminates above the top part of the obliquely mounted conveyor comprising the parallel conveyor chains 14 and 15 interconnected by a plurality of rod-shaped supports 16 which are perpendicular to these conveyor chains. The conveyor chains 14 and 15 are mounted at both sides of a guide plate 17 in such a manner that they are located at a slight distance from this guide plate 17 when travelling above the latter plate. The conveyor chains 14 and 15 are each driven by a pair of gear wheels, such as 18 and 19, of which 18 is the driving one. In the rest position of the conveyor 14, 15 a rod-shaped support 16 is located immediately below the channel 13.

Below the lower end of the conveyor 14, 15 is mounted a synchronizing station which includes a chute 20 which is divided in two compartments A and B by the separation wall 21. The bottoms of these compartments are constituted by two movable flaps 22 and 23 which are hingedly connected to the lower ends of the side walls of the chute 20.

Figure 6:
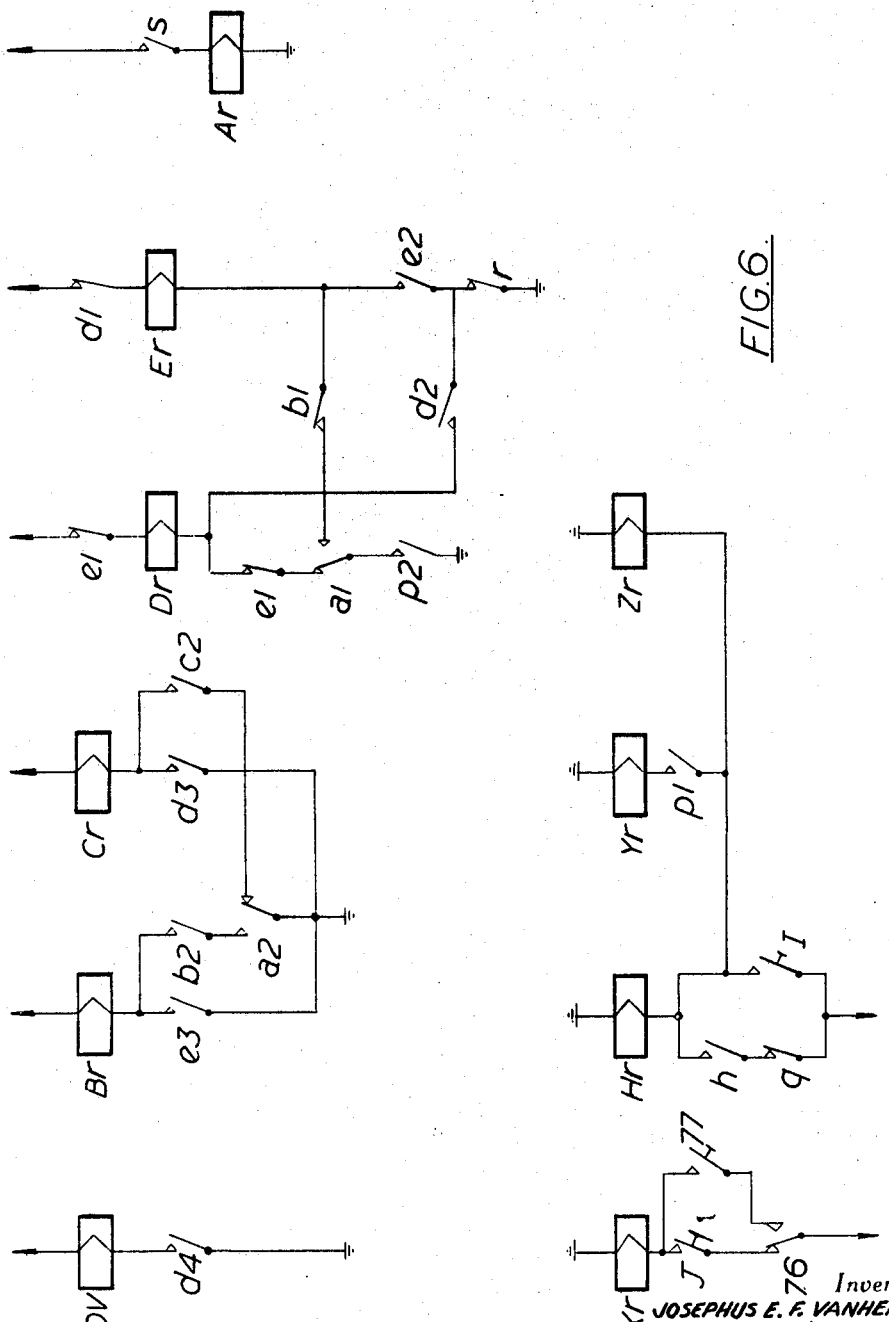
FIG. 6 represents an electrical control circuit of the present transfer mechanism.

A movable two-position deflector plate 24 is hingedly connected ot the top end of the separation wall 21 and is normally held in the position shown by a spring (not shown). It may be displaced towards the opposite position against the action of this spring under the control of a deflector electromagnet DV (FIG. 6). The lower part of the separation wall 21 also constitutes a separation wall for the U-shaped channel 25 which is thus also divided in two compartments C and D. This U-shaped channel is mounted perpendicularly and at a slightly higher level than the lower portion of the main conveyor of the transporting device represented in the copending U.S. patent No. 3,300,026 issued Jan. 24, 1967 and entitled "Transporting device" (G. X. Lens-J. Vanhentenryk-C. De Mol 71–2–1). The lateral walls of the U-shaped channel 25 are provided with a slit and at each side of this channel a conveyor chain 26, 27 is mounted, these conveyor chains being each driven by a pair of gear wheels 28, 28' (not shown) and 29, 29' respectively. The conveyor chains 26 and 27 are each provided with a plurality of conveying pins, such as 30, projecting through the above slits in the lateral walls of the U-shaped channel 25. Each conveying pin of the conveyor chains 26 is hereby exactly situated in the middle between two successive conveying pins of the conveyor chain 27.

The parallel walls of the U-shaped channel 25 are prolonged by two parallel walls 31, 32 respectively, whereas the separation wall 21 is prolonged by the separation wall 33. In this manner two compartments E and F are formed. In the prolongation of the bottom of the U-shaped channel 25 are mounted two pivoted plates 34, 35 which make contact with both sides of the separation wall 33. Below the pivoted plates 34, 35 and at both sides of the separation wall 33 are mounted two pivoted plates 36, 37 which also make contact with the separation wall 33 and which are located above the lower portion of the main conveyor of the above mentioned transporting device, a plurality of letter holders with two compartments, such as 40, being arranged between the conveyor chains 38, 39 of this main conveyor.

Figure 7:
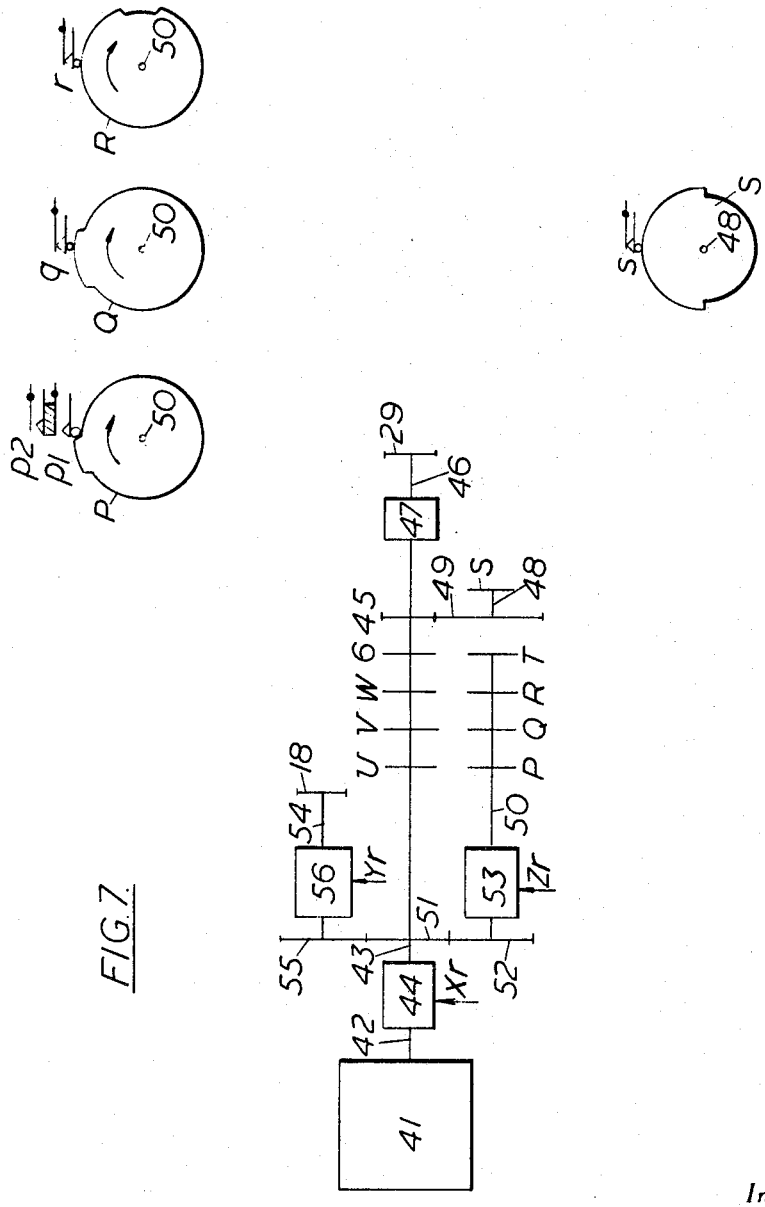
FIG. 7 is a schematic diagram showing the driving means of various parts of the present transfer mechanism.

Principally referring to FIG. 7 there is shown a motor 41 the shaft 42 of which is coupled with the main shaft 43 via the main clutch mechanism 44 which is controlled by the electromagnet Xr (FIG. 6). On the main shaft 43 are mounted cams U, V, W controlling the pairs of pivoted plates 22, 23; 34, 35; 36, 37 respectively, the roller 6 controlling the conveyor 5, and the gear wheel 45. The main shaft 43 is further coupled with the shaft 46, on which the gear wheel 29 controlling the conveyor chain 26, 27 is mounted, via the coupling mechanism 47 which will further be described in detail. The gear wheel 45 is coupled with the shaft 48 bearing the cam S via the gear wheel 49 which has a diameter which is twice as large as that of gear wheel 45, so that when the shaft 43 makes a complete revolution the cam S makes half a revolution. As shown, the cam S is circular and presents a first half with a smaller diameter and a second half with a larger diameter. It controls a contact $s$ which is opened and closed when it is situated in front of the above first and second halves respectively.

The main shaft 43 is further coupled with the shaft 50 via the identical gear wheels 51, 52 and the single revolution clutch mechanism 53 which is controlled by the electromagnet Zr (FIG. 6). The shaft 50 bears the cams P, Q, R controlling the contacts $p_1$, $p_2$; $q$; $r$ respectively and the above mentioned cam T controlling the displacement of the suction arm 11. The main shaft 43 is also coupled with the shaft 54 carrying the gear wheel 18 driving the conveyor 14, 15 via the identical gear wheels 51, 55 and the half revolution clutch mechanism 56 which is controlled by the electromagnet Yr (FIG. 6).

The above clutch mechanisms 44, 53 and 56 are for instance of the type disclosed in the British patent No. 876,739 published Sept. 6, 1961, and entitled "An Improved Single Revolution Clutch" (K. R. Thompson, inventor). When the electromagnet Xr is energized the main clutch mechanism 44 is operated and the main shaft 43 is then coupled with the motor shaft 42 in such a manner that the movement of the shaft 43 and of the axles of the gear wheels 52 and 55 are synchronized with that of the main conveyor. When the electromagnet Yr is energized the clutch mechanism 56 is operated and the shaft 54 is then coupled with the main shaft 43 during the time interval required by the latter shaft 43 to make half a revolution. Finally, when the electromagnet Zr is energized the clutch mechanism 53 is operated and the shaft 50 is then coupled with the main shaft 43 during the time period required by the latter shaft to make a single revolution.

Figure 9:
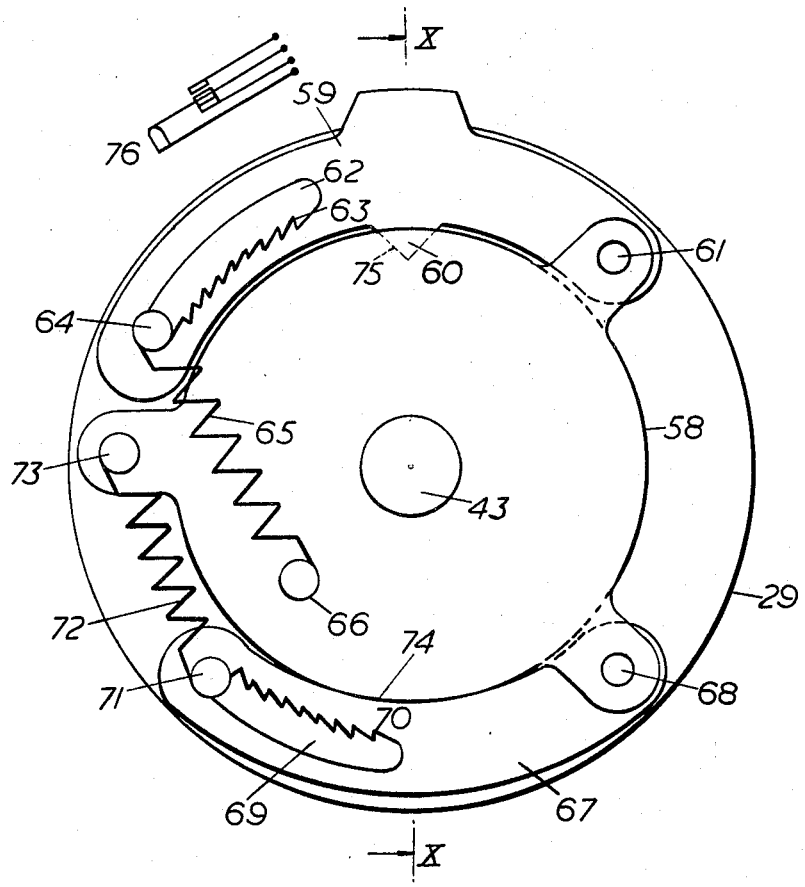
FIG. 9 is a front view of a first embodiment of a coupling mechanism and an associated gear wheel, both forming part of the present transfer mechanism.
Figure 10:
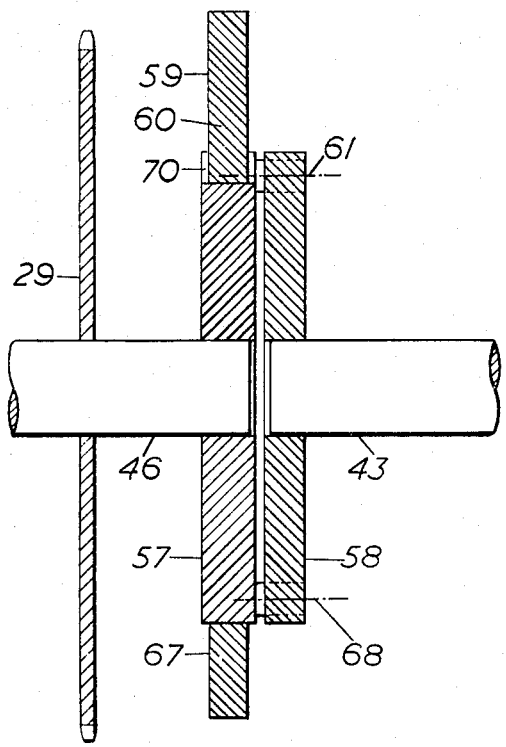
FIG. 10 is a cross-sectional view along the line X—X of FIG. 9.

Principally referring to FIGS. 9 and 10 the above coupling mechanism 47 comprises a disc 57 keyed on the shaft 46 and a disc 58 secured to the main shaft 43. The above gear wheel 29 is also shown. A curved coupling arm 59, provided with a triangular beak 60, is pivoted at one end about a pin 61 which is integral with the disc 58. The arm 59 is provided with an aperture 62 provided with indentations 63 in one of which is located a pin 64 connected to one end of a spring 65 which is connected at its other end to a pin 66 integral with the disc 58. In an analogous manner a curved arm 67 is pivoted at one end about a pin 68 which is integral with the disc 58 and is provided with an aperture 69 provided with indentations 70 in one of which is located a pin 71 connected to one end of a spring 72 which is connected at its other end to a pin 73 also integral with the disc 58. By displacing the pins 64 and 71 in the apertures 62 and 69 it is possible to modify the tension of the springs 65 and 72 respectively. The inner surface 74 of the curved arm 67 is provided with friction material and makes contact with the disc 57. The disc 57 has a notch 75 into which the beak 60 of the coupling arm 59 is normally engaged. A change-over contact 76 is mounted above the coupling arm 59 and is included in the operating circuit of the above electromagnet Xr (FIG. 6). This contact 76 may only be operated by the rotating coupling arm 59 when the beak 60 of the latter arm is disengaged out of the notch 75 in the disc 57. The tension of the spring 72 is so regulated that the friction exerted by the arm 67 on the disc 57 through the friction surface 74 is by itself insufficient to rotate the latter disc 57 when the driving disc 58 is rotated. This friction however permits the disc 57 and hence the shaft 46, to take as rapidly as possible the velocity of the driving shaft 43 without shocks and without it being necessary to use a highly tensioned spring 65, at the moment the latter shaft 43 is rotated. Indeed, when this happens the beak 60 which is normally engaged in the notch 75 has the tendency to jump out of this notch 75 due to the large inertia of the disc 57. A highly tensioned spring 65 would therefore seem to be required. However, by the use of the friction arm 67 this inertia is considerably lowered, since the friction tends to rotate the disc 57 in the same direction as the disc 58. It should be noted that the use of a low tensioned spring 65 is required for security reasons, since it may happen that after the shafts 43 and 46 have been synchronized, the shaft 46 is suddenly blocked due to a letter conveyed by the conveyor chain 26 or 27 being erroneously stopped for some reason. In order not to destroy this letter it is clear that the shaft 46 must be uncoupled from the still rotating shaft 43 as rapidly as possible. In other words the beak 60 must be rapidly disengaged out of the notch 75 and this is only possible when the spring 65 has a low tension. When the beak 60 is disengaged out of the notch 75, the position of the change-over contact 76 will be modified and the electromagnet Xr, controlling the main clutch mechanism 44, is released due to which the main shaft 43 is uncoupled from the motor shaft 42.

Figure 11:
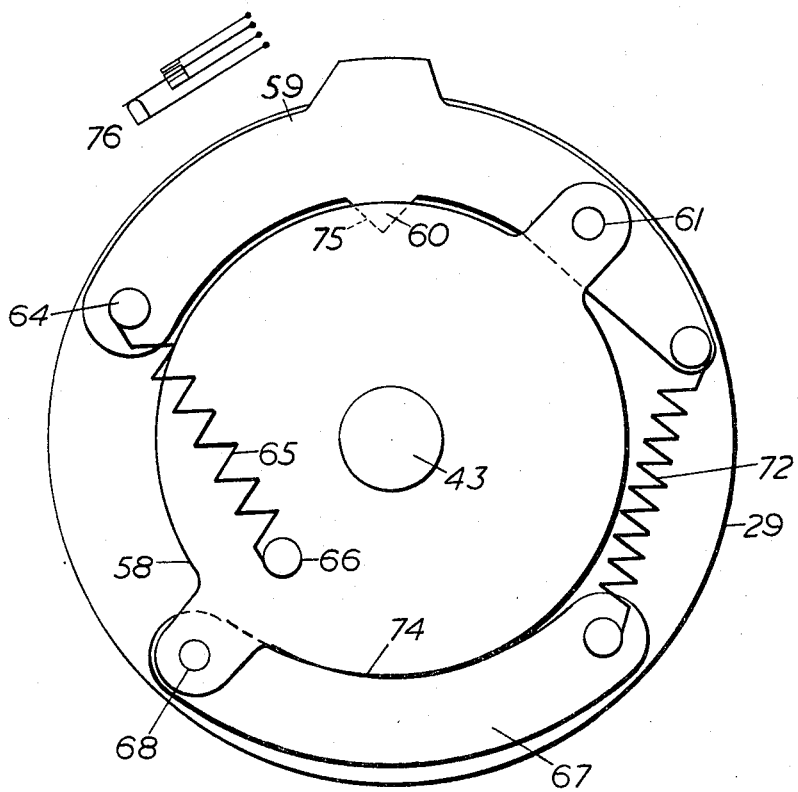
FIG. 11 shows a front view of a second embodiment of this coupling mechanism together with an associated gear wheel.

Principally referring to FIG. 11 there is shown a modified clutch mechanism 44, wherein the disc 58 carriers two curved arms 59 and 67 which are pivoted about the pins 61 and 68 which are integral with the disc 58. The one ends of the arms 59 and 67 are interconnected by means of the spring 72 and the arm 59 is connected at its other end to the pin 66, integral with the disc 58, by the spring 65. The arm 59 has a beak 60, the inner surface 74 of the arm 67 is provided with a friction material and the disc 58 has a notch 75 into which the beak 60 is normally engaged. This clutch mechanism has the advantage that as long as the beak 60 is engaged in the notch 75 the friction exerted by the arm 67 on the disc 58 is larger and becomes smaller when the beak 60 is no longer engaged in the notch.

It is supposed that an operator is able to process one letter per mean time cycle T equal to 500 milliseconds and accordingly the main conveyor chains 38, 39 are displaced at a speed such that a compartment of a letter holder 40 is brought under the pivoted plates 36, 37 in a position to receive a letter, once per time cycle T. As will be described in detail later, when an operator starts the processing of a letter the clutch mechanisms 44, 53 and 56 are successively operated. When the main clutch mechanism 44 is operated the main driving shaft 43 is rotated in synchronism with the displacement of the main conveyor 38, 39 i.e. it performs one revolution per time cycle T defined by the main conveyor. Hence, during this time cycle, the cams U, V, W, the roller 6 and the gear wheel 29 also perform a single revolution, whereas the cam S performs half a revolution. Principally referring to FIG. 8 the closure and opening periods are represented by positive and negative steps respectively. The cam S closes and opens the contact $s$ with a period equal to 2T, the closure and opening time intervals being equal to T. The cam U displaces the bottom flaps 22, 23 in a manner such that during a period equal to 2T each bottom flap is closed for a time interval $T_2$ equal to $3T/2$ and opened for a time interval $T_3$ equal to $T/2$. Hereby the closure periods of the bottom flaps 22 and 23 start together with the closure and opening time intervals of the contact $s$ respectively. In the way shown on FIG. 8 the cam V displaces the pivoted plates 34, 35, whereas the cam W displaces the pivoted plates 36, 37. The roller 6 displaces the conveying belts such as 5, over a distance such that a letter delivered to it by the suction head 12 is conveyed into the channel 13. The gear wheels such as 29, displace each of the conveyor chains 26, 27 over a distance such that a conveyor pin 30 passes the position G once per two time cycles T.

When the clutch mechanisms 53 and 56 are operated, the shafts 50 and 54 are not rotated in synchronism with the main driving shaft 43, but the shaft 54 performs a half revolution during a period equal to $T/2$, whereas the shaft 50 performs a single revolution during a period equal to T. Due to the half rotation of the shaft 54 the conveyor 14, 15 is displaced over a distance which is such that another rod-shaped support 16 is brought below the lower output end of the channel 13. Due to the single revolution of the shaft 50, the cams P, Q, R, T also perform one revolution. The cam T controls the displacement of the suction head 12 in such a manner that the latter performs the displacement O A B C D E F during a time cycle T. The cam P controls the make contacts $p_1$ and $p_2$ and is able to close the latter during a time interval $T_4$ of 60 milliseconds; the cam Q controls the break contact $q$ and is able to close the latter during a time interval $T_6+T_7$ equal to 90 ms.; finally the cam R controls the break contact $r$ and is able to open the latter during a time period $T_5$ of 20 ms. In their rest position, the cams P, Q and R are positioned as shown i.e. the contacts $p_1$ and $p_2$ are open and the contacts $q$ and $r$ are closed. When the cams P, Q R start rotating the make contacts $p_1$ and $p_2$ are immediately closed for $T_4=60$ ms., the break contact $q$ remains closed for another 60 ms. and also the break contact $r$ remains closed for 380 ms. After 60 ms. have elapsed since the start of the rotation, the contacts $p_1$, $p_2$ $q$ are opened and the break contact $r$ is still closed. After $T_1=380$ ms. have elapsed since the start of the rotation, the contact $r$ only is opened and is closed after $T_1+T_5=400$ ms. have elapsed since the start of the rotation. Finally after 470 ms. have elapsed since the start of the rotation the contact $q$ is closed, whereas the contacts $p_1$, $p_2$ remain open and the contact $r$ remains closed.

The operation of the above described transfer mechanism is as follows. At the start of an operation the push-button J (FIG. 6) is depressed and locked in a not shown but well known manner. Due to this and the changeover contact 76 being in its rest position, the electromagnet X$r$ is energized as follows: ground, winding of electromagnet X$r$, push-button J, change-over contact 76 in its rest position, battery.

The main clutch mechanism 44 is operated and consequently the cams U, V, W, S the roller 6 and the gear wheels, such as 29, are rotated so that the pivoted plates 22, 23 and 34 to 37, the conveying belts 5 and the conveying chains 26, 27 are displaced in synchronism with the main conveyor 38, 39.

The operator then depresses the push-button I, thus energizing the relay H$r$ and the electromagnet Z$r$. The relay H$r$ is locked via its closed make contact $h$ and the closed break contact $q$ of the cam Q. Due to the operation of the electromagnet Z$r$ the single revolution clutch mechanism 53 is energized and the cams P, Q, R and T are rotated for a time period equal to T. By the rotation of the cam P the make contacts $p_1$ and $p_2$ are closed. By the closure of the make contact $p_1$ the electromagnet Y$r$ is energized as follows: ground, winding of electromagnet Y$r$, closed make contact $p_1$, closed push-button I (or closed make contact $h$ in series with the closed break contact $q$), battery. Due to the energization of the electromagnet Y$r$ the half revolution clutch mechanism 56 is operated and the cam 18 is rotated and the conveyor 14, 15 is consequently displaced during a half time period $T/2$. By the rotation of the cams Q and R the contacts $q$ and $r$ remain closed, so that the relay H$r$ remains locked for at least 60 milliseconds. The relay H$r$ may however remain energized for a longer time when the push-button I is maintained depressed.

At the moment of depressing the push-button I the make contact $s$ is open or closed. In order to be sure that a letter dropping in the chute 20 should always fall on a closed bottom flap 22, 23, these bottom flaps are closed for a period equal to $3T/2$ and opened only for a time interval equal to $T/2$, the opening periods not overlapping each other, and the displacement of the deflector plate 24 is controlled by the contact $s$ which is alternately closed and opened during time intervals equal to T, the closure periods of the bottom flaps 22 and 23 starting together with the closure and opening time intervals of the contact $s$ respectively.

When the make contact $s$ is open, the relay A$r$ is not operated and the relay D$r$ is energized as follows at the moment the make contact $p_2$ is closed: ground, closed make contact $p_2$, change-over contact $a_1$ in its rest position, closed break contact $c_1$, winding of relay D$r$, closed break contact $e_1$, battery.

By the opening of the break contact $d_1$ the relay E$r$ is prevented from being operated.

The relay D$r$ is locked as follows: battery, closed break contact $e_1$, winding of relay D$r$, closed make contact $d_2$, closed break contact $r$, ground.

By the closure of the make contact $d_3$ the relay C$r$ is energized as follows: ground, closed make contact $d_3$, winding of relay C$r$, battery.

The relay C$r$ is locked as follows: battery, winding of relay C$r$, closed make contact $c_2$, change-over contact $a_2$ in its rest position, ground.

By the closure of the make contact $d_4$ the deflector electromagnet DV is energized due to which the deflector plate 24 is displaced.

By the opening of its break contact $c_1$ the relay C$r$ opens the operating chain of the relay D$r$ which can only be released by the opening of the break contact $r$ a time interval $T_1$ equal to 380 ms. after the start of the rotation of the cam R. It should also be noted that notwithstanding the fact that the relay D$r$ is released and hence the deflector plate is again in its rest position at that moment, the relay D$r$ cannot again be operated during the same period that $s$ is open since the relay C$r$ remains operated as long as the change-over contact $a_2$ remains in the rest position shown, this position corresponding to the make contact $s$ being open. In other words the deflector plate 24 cannot be displaced twice per time cycle T.

When the make contact $s$ is closed, the relay A$r$ is operated as follows: ground, closed make contact $s$, winding of relay A$r$, battery.

The relay E$r$ is then energized as follows: ground, closed make contact $p_2$, change-over contact $a_1$ in its work position, closed break contact $b_1$, winding of relay E$r$, closed break contact $d_1$, battery.

By the opening of the break contact $e_1$ the relay $Dr$ is prevented from being energized.

The relay $Er$ is locked as follows: battery, closed break contact $d_1$, winding of relay $Er$, closed make contact $e_2$, closed break contact $r_1$, ground.

By the closure of the make contact $e_3$ the relay $Br$ is energized as follows: ground, closed make contact $e_3$, winding of relay $Br$ battery.

By the opening of its break contact $b_1$ the relay $Br$ opens the normal operating circuit of the relay $Er$ which can only be released by the opening of the break contact $r_1$.

The operated relay $Br$ is locked as follows: battery, winding of relay $Br$, closed make contact $b_2$, change-over contact $a_2$ in its work position, ground.

From the above it follows that the relays $Br$ and $Er$, when the contact $s$ is closed, have the same function as the relays $Cr$ and $Dr$ when the contact $s$ is open.

As described above the cam T of the suction device is rotated due to the operation of the electromagnet $Zr$, and by the energization of the relay $Gr$ the electromagnet $Yr$, indirectly controlling the displacement of the conveyor 14, 15, is operated. The movements of the suction arm 11 and of the conveyor 14, 15 are so synchronized that the conveyor 14, 15 has already finished its displacement at the moment a letter delivered to the conveying belts 5 by the suction arm 11 has been transferred by these belts into the channel 13.

When the push-button I is depressed for the first time a first letter is sucked up from the stack. The conveyor 14, 15 is displaced and the deflector plate 24 is displaced or not, but this remains without effect since no letter is positioned on the conveyor 14, 15.

When the push-button I is depressed for the second time:

The first letter is transferred into the channel 13, the lower edge of this letter being supported by a support 16 located immediately below this channel;
a second letter is sucked up.

When the push-button I is depressed for the third time:

the first letter is transferred to the viewing position VP where the destination on this letter is read.
the second letter is transferred into the channel 13; a third letter is sucked up.

When the push-button I is depressed for the fourth time:

the first letter is transferred to the indexing position IP where the destination previously read is indexed;
the second letter is transferred to the viewing position VP;
the third letter is transferred into the channel 13;
the fourth letter is sucked up.

It is supposed that the contact $s$ is open when the push-button I is depressed for the fifth time.

Due to this the deflector plate 24 is in the position shown so that the first letter is transferred to the chute 20 where it falls on the bottom flap 22. Moreover the second letter is transferred to the indexing position;
the third letter is transferred to the viewing position;
the fourth letter is transferred into the channel 13;
a fifth letter is sucked up.

Figure 8:
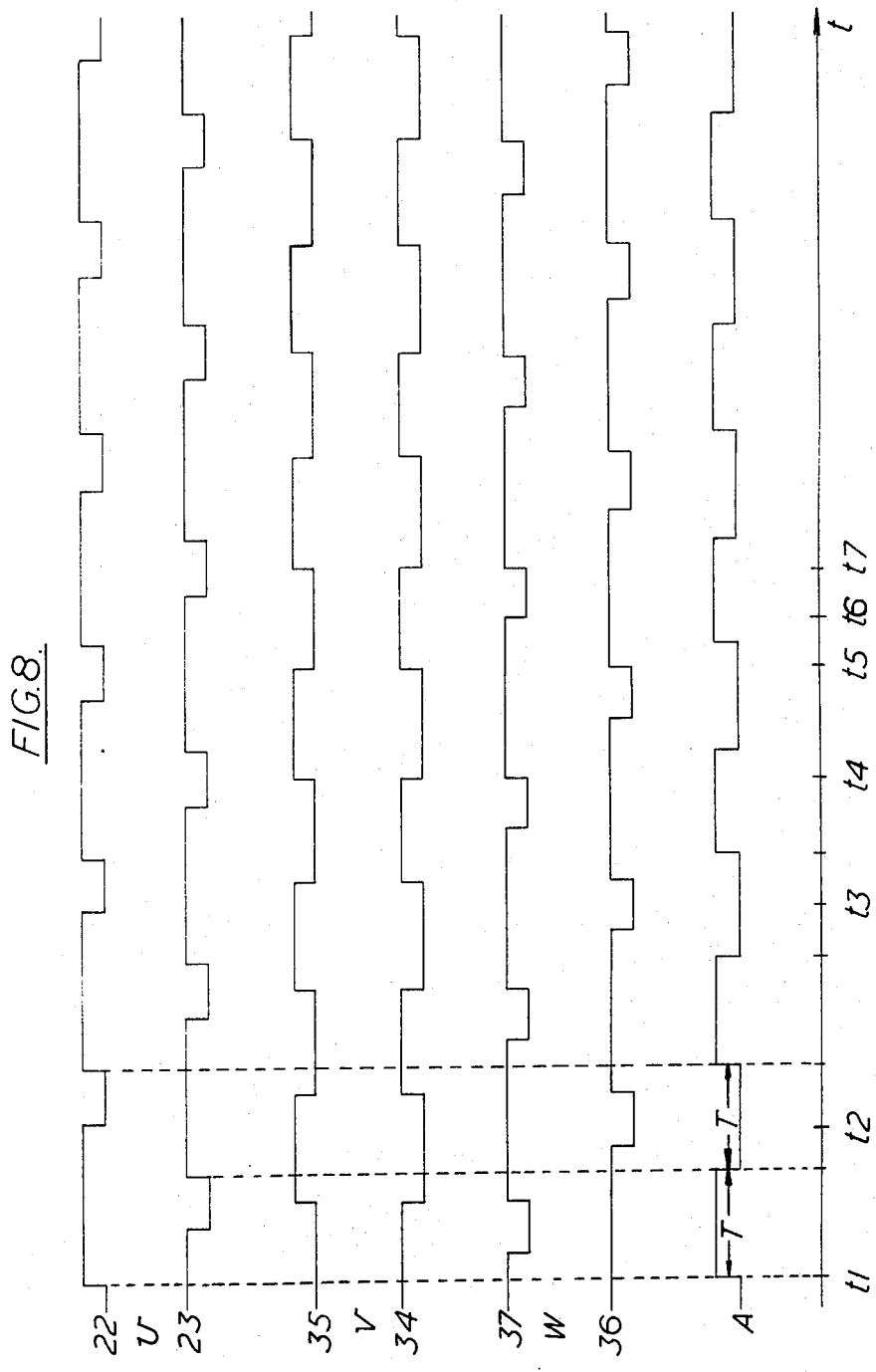
FIG. 8 is a time diagram schematically representing the movements of some of the parts represented in FIG. 3.

The first letter falls on the bottom flap 22 within the time interval elapsing from $t_1$ to $t_2$ (FIG. 8). At the moment $t_2$ the bottom flap 22 is displaced so that the letter falls in the compartment C, a conveying pin 30 of the conveyor 26 being located in the position G (FIG. 3) at that moment. The rear edge of the letter fallen in the compartment C is then displaced by the next conveying pin of the conveyor 26, this pin and hence the rear edge of the letter arriving in the position G two time cycles T later i.e. at the moment $t_3$. The speed of the conveyor 26 is such that the letter having the maximum length conveyed by it may arrive with its front edge in the position H, at the entry of the compartment F, at the moment $t_4$. Therefore the plate 35 must be in its closed position at that moment (see diagram 35 on FIG. 8). The letter is transferred on the plate 35 in its closed position within the time interval elapsing from $t_4$ to $t_5$. The plate 35 is pivoted at the moment $t_5$ so that the letter falls on the plate 37 in its closed position, within the time interval elapsing from $t_5$ to $t_6$. Finally the letter falls in a letter holder 40 within the time interval elapsing from $t_6$ to $t_7$ i.e. when the plate 37 is displaced., The reason of the relay $Hr$ and the cam Q with its contact $q$ are the following. It may happen that the push-button is only released near the end of the single revolution of the shaft 50. Since the push-button I controls the single revolution clutch mechanism $Zr$, for the shaft 50, it may happen that this clutch mechanism is then not yet released at the end of this revolution due to which the shaft 50 will make another revolution and that another letter will be sucked up and transferred into the channel 13. In order that this letter should be able to be positioned on the conveyor 14, 15 the latter conveyor must therefore also be displaced together with the shaft 50. It has been found that the dangerous zone when releasing the push-button I starts at about 25 ms. before the end of a revolution of the shaft 50. Therefore the contact $q$ is closed at 30 ms. before this end, and since it is supposed that the push-button is not yet released at that moment the relay $Hr$ is operated. Consequently the relay $Hr$ is then locked during the period that $q$ is closed even when the push-button I is released, so that the electromagnet $Yr$ is operated when the contact $p_1$ is closed.

Above it has been mentioned that when the conveyor 26, 27 is erroneously stopped the position of the contact 76 is modified due to which the electromagnet $Xr$ is released, thus uncoupling the motor shaft 42 from the shaft 43. In order to be able to operate again this coupling, even when the contact 76 is still in its work position, the push-button 77 has been provided. By the closure of this push-button 77 the electromagnet $Xr$ is energized and the motor shaft 42 is coupled with the shaft 43.

While the principles of the invention have been described above in connection with specific apparatus, it is to be clearly understood that this description is made only by way of example and not as a limitation on the scope of the invention.

We claim:
1. Transfer mechanism for transferring articles from a first conveying means onto a second conveying means, comprising:
an article conveying device;
an article segregating device juxtaposed with said conveying device;
first conveying means disposed adjacent to said segregating device and mounted in an inclined position;
a synchronizing station having first and second synchronizing positions adjacent to said first conveying means, said positions comprise first and second juxtaposed compartments of a two-compartment chute;
first and second transfer means coupled to said synchronizing station and constituted by first and second movable bottom flaps of said first and second compartments respectively, said compartments being closed and opened when the associated bottom flap is in its first and second positions respectively;
second conveying means disposed adjacent to said first and second movable bottom flaps;
a displaceable diverting means in said synchronizing station comprising a movable two-position deflector plate mounted below the end of said first conveying means which, when in its first position, permits and prevents access to said first and second synchronizing positions, respectively, and which, when in its second position, permits and prevents access to said second and first synchronizing positions, respectively;

first and second control means, said first control means is coupled to said displaceable diverting means to divert an article to said first or second synchronizing position, and said second control means is coupled to said first and second movable bottom flaps to operate said first and second flaps in an alternating manner;

said first control means include first timing means which are periodically and alternately operated and released in timed relationship with said second conveyor means with a period equal to 2T, T being the time interval required for an operator to process an article, and the operation and release time intervals being each equal to T;

operator controlled first registering means for registering the start of a transfer operation;

second registering means which are operated when said first timing means and said first registering means are simultaneously released and operated respectively, to control the displacement of said deflector plate from said first to said second position and which are released after a time interval $T_1$ at most equal to T;

displacement means which are operated when said second registering means are released to displace said deflector plate from said second to said first position; and said first control means including third registering means which are operated when said first timing means and said first registering means are simultaneously operated respectively and which are released after said time interval $T_1$.

2. Transfer mechanism as claimed in claim 1, characterized in that said second control means include:

second timing means are periodically and alternatively operated and released with a period equal to 2T, the operation and release time intervals being equal to $T_2$ and $T_3$ respectively. $T_2$ being larger than T by a time interval at least equal to the time interval for transferring a letter from said first conveying means on a bottom flap and said time interval $T_2$ starting when said first timing means are operated;

third timing means which are periodically and alternatively operated and released with a period equal to 2T, the operation and release time intervals being equal to $T'_2$ and $T'_3$ which are equal to $T_2$ and $T_3$ respectively, said time interval $T'_2$ starting when said first timing means are released;

first displacement control means, controlled by said second timing means, for bringing said first bottom flap in said first and second positions when said second timing means are operated and released respectively;

second displacement control means, controlled by said third timing means, for bringing said second bottom flap in said first and second positions when said third timing means are operated and released respectively.

3. Transfer mechanism as claimed in claim 2, characterized in that said first control means further include:

first memory means (Cr) which are operated when said second registering means are operated and which are released when said first timing means are operated;

second memory means (Br) which are operated when said third registering means are operated and which are released when said first timing means are released.

4. Transfer mechanism as claimed in claim 3, characterized in that said second and third registering means are prevented from being operated when said first and second memory means are operated respectively.

5. Transfer mechanism as claimed in claim 3, characterized in that said second and third registering means are prevented from being operated when said third and second registering means are operated respectively.

6. Transfer mechanism as claimed in claim 1 characterized in that said operator controlled first registering means is constituted by a first cam (P) mounted on a first driven shaft (50) coupled with a driving shaft (43), continuously rotated in timed relationship with said second conveying means, through a single revolution first clutch mechanism (53) which is controlled by a first electromagnet (Zr) the winding of which is branched between the terminals of a DC source in series with a push-button (I), that when said first driven shaft starts rotating said first cam closes normally open first and second cam contacts ($p_1$, $p_2$) for a time interval $T_4$ smaller than T, that the time required by said first driven shaft for performing a complete rotation is equal to $T_1$ and that said first driven shaft carries a second cam (R) which opens a normally closed third cam contact (r) for a time interval $T_5$ a time interval $T_1$ after said first driven shaft starts rotating, $T_1$ being larger than $T_4$ and $T_1+T_5$ being smaller than T.

7. Transfer mechanism as claimed in claim 6, characterized in that said first timing means are constituted by a first relay (Ar), that said second and third registering means are constituted by second (Dr) and third (Er) relays respectively, that said first and second memory means are constituted by fourth (Cr) and fifth (Dr) relays respectively, that the winding of said second relay is connected between the terminals of said DC source in series with a first series circuit comprising a break contact ($e_1$) of said third relay, a break contact ($c_1$) of said fourth relay, a first change-over contact ($a_1$) of said first relay in its rest condition and said second cam contact ($p_2$), said first series circuit being connected in parallel with a second series circuit constituted by a make contact ($d_2$) of said second relay and said third cam contact (r), that the windings of said third relay is connected between the terminals of said DC source in series with a third series circuit comprising a break contact ($d_1$) of said second relay, a break contact ($b_1$) of said fifth relay, said first change-over contact in its work position and said second cam contact ($p_2$), said third series circuit being connected in parallel with a fourth series circuit constituted by a make contact ($e_1$) of said third relay and said third cam contact, that the winding of said fourth relay is connected between the terminals of said DC source in series with another make contact ($d_3$) of said second relay, said other make contact being branched in parallel with a fifth series circuit comprising a make contact ($c_2$) of said fourth relay and a second change-over contact ($a_2$) of said first relay in its rest condition, and that the winding of said fifth relay is connected between the terminals of said DC source in series with another make contact ($e_3$) of said third relay, said other make contact being branched in parallel with a sixth series circuit comprising a make contact ($b_2$) of said fifth relay and said second change-over contact in its work position.

8. Transfer mechanism as claimed in claim 6, characterized in that said winding of said first electromagnet (Zr) is branched in parallel with the series connection of said first cam contact and of the winding of a second electromagnet (Yr) which controls a half revolution second clutch mechanism (56), the time interval required for performing a half revolution being equal to T/2, and that when operated said second clutch mechanism couples said driving shaft to displacement means (18) for said first conveying means.

9. Transfer mechanism as claimed in claim 6, characterized in that a third cam (Q) is mounted on said first driven shaft which when rotated closes a normally open fourth cam contact ($q$) for a time interval T6, smaller than T1 and starting together with $T_4$, and for a time interval $T_7$ starting later than $T_1+T_5$ and finishing at the end of the rotation of said first driven shaft, that the winding of a sixth relay (H$r$) is branched in parallel with the winding of said first electromagnet, said pushbutton being branched in parallel with the series connection of a make contact ($h$) of said sixth relay and said fourth cam contact ($q$).

10. Transfer mechanism as claimed in claim 6, characterized in that said driving shaft is coupled to a second driven shaft (46) driving said second conveying means (47) via a coupling mechanism (47) which is automatically uncoupled from said driving shaft when said second conveying means (26, 27) are erroneously stopped.

11. Transfer mechanism, according to claim 10, wherein: said coupling mechanism includes a first coupling member (59) mounted on one of said shafts and able to be operatively coupled to the other of said shafts under the control of a first spring (65), characterized in that said first coupling member is mounted on said driving shaft, together with a second coupling member (67) which is able to be operatively coupled to said driven shaft under the control of a second spring (72) the tension of which is so chosen that said second coupling member is by itself uncapable of realizing the coupling of said driving and driven shafts.

12. A coupling mechanism as claimed in claim 11, characterized in that said first and second coupling members are constituted by first and second arms each of which is pivoted at its one end (61, 68) on a first disc (58) fixed on said driving shaft, said first and second arms being connected at their other ends to first (66) and second (73) pins on said first disc by means of said first (65) and second (72) springs respectively, that said first arm is provided with a beak (60) normally engaged and maintained by means of said first spring in a notch (75) of a second disc (57) fixed on said driven shaft, and that said second arm is normally maintained into contact with said second disc over a large friction surface (74) by means of said second spring.

13. A coupling mechanism as claimed in claim 11, characterized in that said first and second coupling members are constituted by first and second arms, that said first arm is pivoted in a point (61) between its other end and its one end which is connected to a first pin (66) on a first disc (58) fixed on said driving shaft by means of said first spring (65), that said second arm is pivoted at its one end (68) on said first disc and is connected at its other end to the other end of said first arm by means of said second spring (72), that said first arm is provided with a beak (60) normally engaged and maintained by means of said first spring in a notch (75) of a second disc (57) fixed on said driven shaft and that said second arm is normally maintained into contact with said second disc over a large friction surface (74) by means of said second spring.

14. Transfer mechanism as claimed in claim 10, characterized in that said coupling mechanism includes first (59) and second (67) coupling members mounted on said driving shaft and able to be operatively coupled to said second driven shaft under the control of first (65) and second (72) springs, the tension of said second spring being so chosen that said second coupling member is by itself uncapable of realizing the coupling of said driving and second driven shafts.

15. Transfer mechanism as claimed in claim 14, characterized in that said first and second coupling members are constituted by first and second arms each of which is pivoted at its one end (61, 68) on a first disc (58) fixed on said driving shaft said first and second arms being connected at their other ends to first (66) and second (73) pins on said first disc by means of said first (65) and second (72) springs respectively, that said first arm is provided with a beak (60) normally engaged and maintained by means of said first spring in a notch (75) of a second disc (57) fixed on said driven shaft, and that said second arm is normally maintained into contact with said second disc over a large friction surface (74) by means of said second spring.

16. Transfer mechanism as claimed in claim 14, characterized in that said first and second coupling members are constituted by first and second arms, that said first arm is pivoted in a point (61) between its other end and its one end which is connected to a first pin (66) on a first disc (58) fixed on said driving shaft by means of said first spring (65), that said second arm is pivoted at its one end (68) on said first disc and is connected at its other end to the other end of said first arm by means of said second spring (72), that said first arm is provided with a beak (60) normally engaged and maintained by means of said first spring in a notch (75) of a second disc (57) fixed on said driven shaft and that said second arm is normally maintained into contact with said second disc over a large friction surface (74) by means of said second spring.

References Cited
UNITED STATES PATENTS

| | | | |
|---|---|---|---|
| 2,670,087 | 2/1954 | Stehlik. | |
| 3,018,009 | 1/1962 | Osborn et al. | 214—11 |
| 3,062,391 | 11/1962 | Francois | 214—11 |
| 3,312,327 | 4/1967 | Clapp et al. | 198—35 |

ROBERT G. SHERIDAN, *Primary Examiner.*

MARVIN A. CHAMPION, *Examiner.*